June 4, 1963     M. MAYRATH     3,092,239
CARRIAGE FOR CORN AND HAY ELEVATORS
Filed Jan. 19, 1961                    2 Sheets-Sheet 1
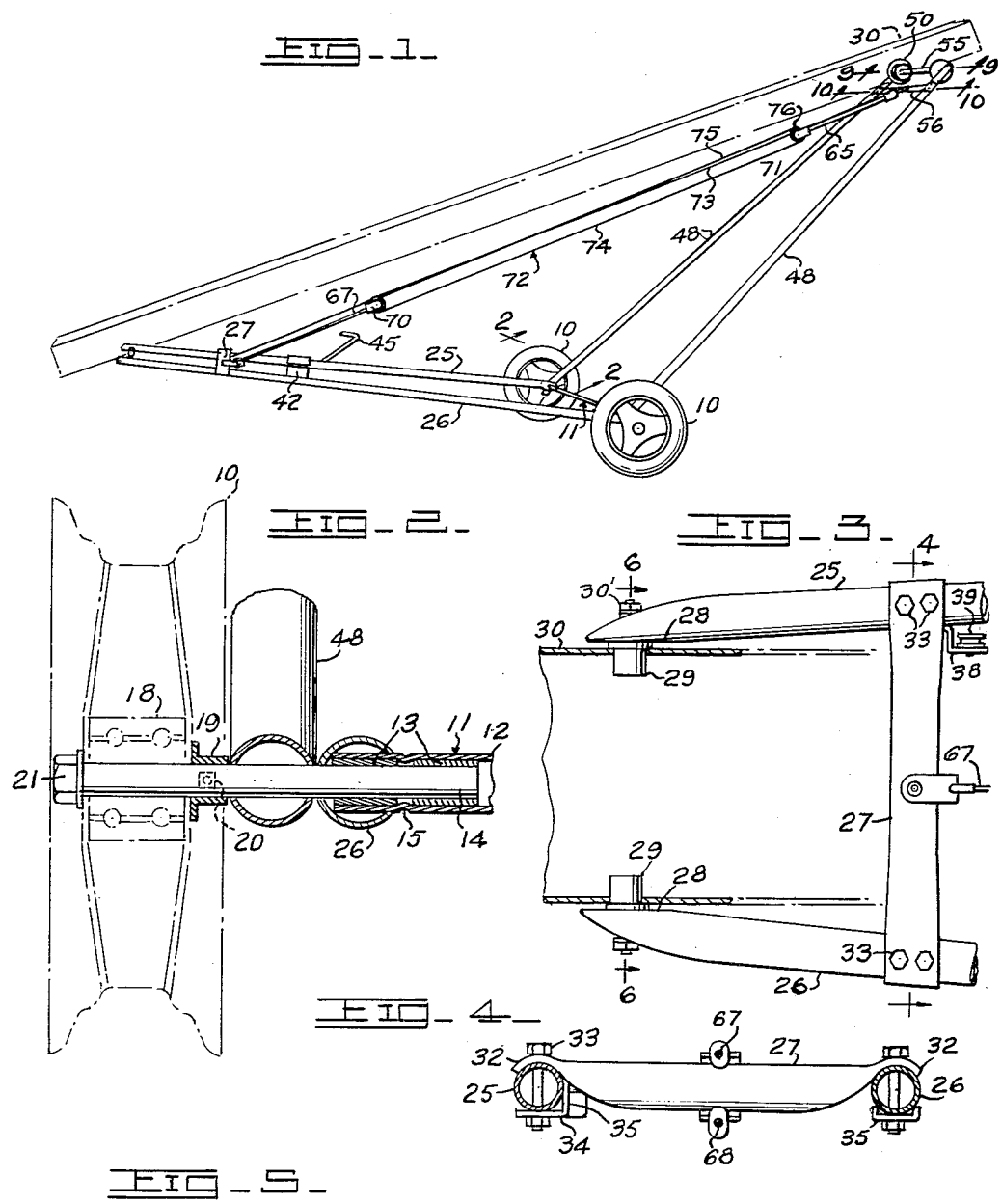
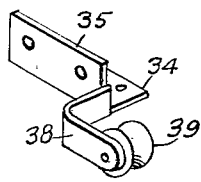
INVENTOR
MARTIN MAYRATH
BY Homer R. Montague
ATTORNEY June 4, 1963  M. MAYRATH  3,092,239
CARRIAGE FOR CORN AND HAY ELEVATORS
Filed Jan. 19, 1961  2 Sheets-Sheet 2
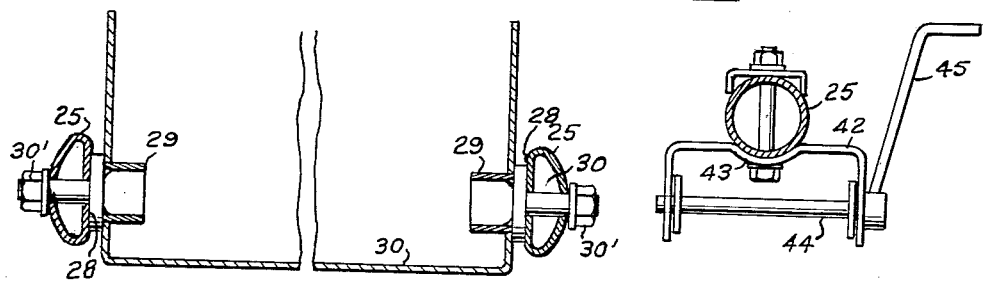
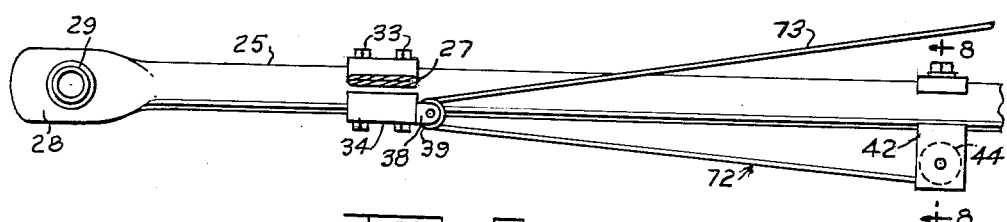
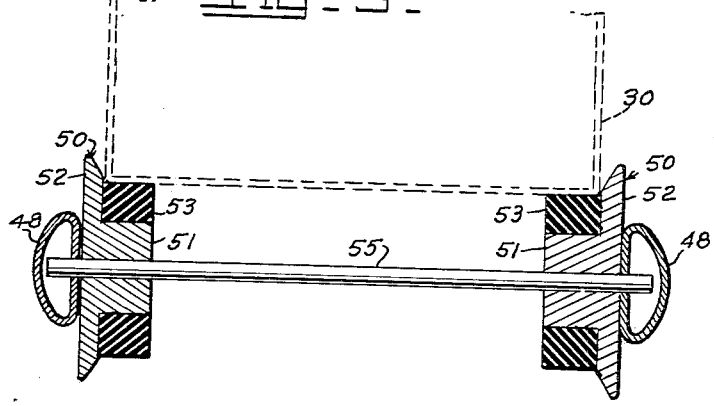
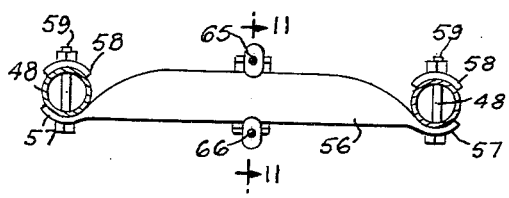
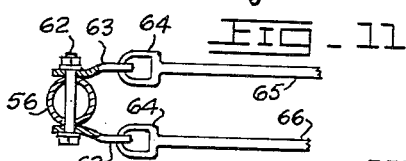
INVENTOR
MARTIN MAYRATH
BY Homer R. Montague
ATTORNEY

United States Patent Office 3,092,239
Patented June 4, 1963

3,092,239
CARRIAGE FOR CORN AND HAY ELEVATORS
Martin Mayrath, 10707 Lennox Lane, Dallas, Tex.
Filed Jan. 19, 1961, Ser. No. 83,743
9 Claims. (Cl. 198—120.5)

This invention relates to a carriage for corn and hay elevators and has particular reference to a wheeled carriage adapted to support a conveyor and movable to different places for use wherever desired.

An important object of the invention is to provide a novel construction most of the parts of which can be galvanized, thus eliminating the unsatisfactory use of paint which chips off, allowing the parts to become rusty.

A further object is to provide a carriage of this type which may be shipped knocked down, thus effecting a substantial saving in shipping costs, the carriage being easily and quickly assembled after delivery.

A further object is to provide a novel axle construction for the carriage, which may be readily assembled with respect to other parts of the device such as the connection thereto of a forward radius rod and rear supporting arms and supporting wheels, and wherein substantially the entire exposed portion of the axle assembly may be in the form of a galvanized tube.

A further object is to provide such a novel axle construction the body of which is formed as a tube, to the ends of which are connected in a novel manner axle spindles adapted for connection with supporting wheels for the carriage, the radius rods and supporting arms being easily assembled on the axle structure prior to the placing of the wheels in position.

A further object is to provide in a structure of this character radius rods projecting forwardly from the axle assembly and adapted for connection to the sides of a trough conveyor, and to provide a brace between the radius rods to strengthen the structure and to maintain the connection of the radius rods with the conveyor trough.

A further object is to provide such a device wherein supporting arms project rearwardly from the axle structure by which they are supported and are provided with guide wheels over and between which the conveyor trough is arranged, the angle between the radius rods and supporting arms being variable in accordance with the intended use of the mechanism and the trough being adapted to roll on the wheels carried by the rear ends of the supporting arms.

A further object is to provide a novel type of conveyor trough supporting wheels at the ends of the supporting arms and to utilize a strengthening cross brace near the rear ends of the supporting arms to brace the structure and to maintain engagement of the free ends of the supporting arms with the axle for the supporting wheels for the conveyor trough.

Other objects and advantages of the invention will become apparent during the course of the following description.

In the drawings I have shown one embodiment of the invention. In this showing:

FIGURE 1 is a perspective view of the supporting carriage, a conveyor trough being shown in broken lines supported thereby;

FIGURE 2 is an enlarged fragmentary sectional view on line 2—2 of FIGURE 1;

FIGURE 3 is an enlarged fragmentary plan view of the free ends of the radius rods and associated elements, a portion of the conveyor trough being shown;

FIGURE 4 is a section on line 4—4 of FIGURE 3;

FIGURE 5 is a detail perspective view of a pulley bracket;

FIGURE 6 is a section on line 6—6 of FIGURE 3;

FIGURE 7 is a fragmentary elevation of the free end of the radius rod remote from the observer in FIGURE 1, elements associated with such radius rod being illustrated;

FIGURE 8 is a section on line 8—8 of FIGURE 7;

FIGURE 9 is an enlarged sectional view on line 9—9 of FIGURE 1;

FIGURE 10 is a similar view on line 10—10 of FIGURE 1; and

FIGURE 11 is a sectional view of the cross brace between the ends of the supporting arms taken substantially on line 11—11 of FIGURE 10.

Referring particularly to FIGURES 1 and 2, the numeral 10 designates a pair of supporting wheels for the device connected to an axle assembly indicated as a whole by the numeral 11 and referred to in detail below. The body of the axle 11 is in the form of a relatively heavy tubular member 12 having its outer surface galvanized to protect it against rust and corrosion. Each end of the tubular member 12 has mounted therein a pair of relatively short slightly spaced bushings 13 which are initially slidable in the tubular member 12 and welded on an axle spindle 14 upon which each wheel 10 is mounted. The spindles 14, bushings 13 and tubular member 12 are assembled as a unit at the factory. After the bushings have been inserted in the ends of the tubular member, the latter is swaged to slightly reduce its diameter to bring it into gripping contact with the bushings 13. Thereafter, each end of the tubular member is rolled stamped or swaged as at 15 to provide portions projecting between the bushings of the pairs 13, thus firmly fixing the elements of the assembly to each other.

The wheels 10 may be of any conventional type, preferably carrying pneumatic tires, and each wheel is provided with ball bearings 18 surrounding the associated spindle 14. Inwardly of each wheel, a flanged collar 19 is fixed to the associated spindle 14 by a set screw 20, for a purpose to be described, and each wheel is maintained in position by a nut 21 threaded on the end of the associated spindle 14.

From the axle assembly 11, slightly forwardly converging radius rods 25 and 26 extend. These radius rods are tubular and preferably have their entire outer surfaces galvanized. The rear end of each radius rod surrounds the axle assembly 11, one side of each radius rod being punched with an opening corresponding to the external diameter of the tubular member 12 and the opposite side being punched to fit over the associated spindle 14 as shown in FIGURE 2.

The free ends of the radius rods 25 and 26 are cut by shearing and are flattened so as to provide inner flat faces 28 (FIGURE 3), these faces being at a slight angle to the axes of the radius rods which converge forwardly as stated. Against each flat face 28 is arranged a short pipe section 29 (FIGURE 6) welded or otherwise secured to a bolt 30' which extends through the adjacent radius rod. The inwardly extending pipe sections project through the side walls of a conveyor trough shown only generally and indicated by the numeral 30, the particular type of conveyor being of no importance in connection with the present invention.

Rearwardly of the pipe sections 29, which form pivot members for the conveyor trough, the radius rods 25 and 26 are cross-braced as at 27 by a galvanized pipe section the ends of which are flattened and then formed arcuately as at 32 to fit over the tops of the radius rods. Such ends 32 are fixed to the radius rods by bolts 33, the lower ends of which respectively pass through plates 34 and 35 which may have bottom portions shaped to fit the radius rods or may be shaped as shown in FIGURE 4. The plate 34 is provided with an upstanding flange 35 lying against the inner side of the radius rod 25 (FIGURE 5). The end of the flange 35 toward the axle assembly is provided with an offset extension 38 supporting a pulley 39 for a purpose to be described. It will be apparent that the cross brace 27 not only acts to strengthen the frame as a whole but also serves to maintain the pivot members 29 in position against spreading and becoming dislodged from the conveyor trough, the brace 27 being bolted in position after the insertion of the members 29 in position as shown in FIGURE 6.

Somewhat rearwardly of the brace 27, a bracket 42 is carried by the radius rod 25. This bracket has an upper portion arched as at 43 to fit against the bottom of the radius rod 25 and is provided with depending arms rotatably supporting a cable reel 44 adapted to be turned by a handle 45, any suitable means (not shown) being provided for preventing reverse rotation of the reel 44, as will become apparent later.

Rearwardly and upwardly of the axle assembly extends a pair of supporting arms 48, these arms converging rearwardly as shown in FIGURE 1. The forward or lower ends of the supporting arms 48 are punched to provide openings corresponding to the diameter of the spindles 14 to receive such spindles as shown in FIGURE 2. The supporting arms 48 are externally galvanized from end to end, and the ends which surround the spindles 14 are arranged between the rear ends of the radius rods 25 and 26 and the flanged collar 19. This collar maintains the adjacent ends of the radius rods and supporting arms in proper position against outward movement away from each other and the collar also permits the removal of either or both of the wheels 10 while maintaining the radius rods and supporting arms in position.

The rear ends of the supporting arms 48 are flattened similar to the forward ends of the radius rods to provide faces parallel to each other, and inwardly and adjacent these flat faces are arranged wheels or rollers 50 adapted to movably support the upper rear end of the conveyor trough. Each wheel 50 is provided with a hub portion 51 and a radially extending annular flange 52, and each hub portion 51 is surrounded by a rubber or similar annular cushion 53 which bears the weight of the trough 30. This cushioning of the trough is advantageous since in adjusting the device or moving it from place to place the jolting of the carriage is prevented from denting or otherwise marring the conveyor trough.

The wheels 50 are supported on an axle 55 to which they may be welded and the ends of these axles project through the inner walls of the flattened ends of the supporting arms 48, as shown in FIGURE 9. A cross brace 56 (FIGURE 10) similar to the cross brace 27 is connected between the supporting arms 48 to brace them with respect to each other and to prevent the spreading of the free ends of the supporting arms, thus properly maintaining such arms in engagement with the ends of the axle 55. The cross brace 56 also is preferably made of completely externally galvanized tubing, the ends of which are flattened and then arched as at 57 to fit against the bottoms of the adjacent portions of the supporting arms 48. The plates 58 engage the tops of the arms 48 and are secured to such arms and to the curved brace ends 57 by bolts 59. The plates 58, as is true of the plates 34 and 35 (FIGURE 4) permit the substantial tightening of the bolts for the braces without collapsing or otherwise disturbing the radius rods or supporting arms.

Incidental to the use of the apparatus, means are provided for varying the angularity of the radius rods and supporting arms with respect to each other in accordance with the desired discharge height of the conveyor trough. Referring to FIGURE 11, it will be noted that a bolt 62 passes through the brace 56 centrally of the width thereof and fixes in position with respect thereto upper and lower plates 63 connected to yokes 64 carried respectively by rods 65 and 66. Similar means, not shown in detail (FIGURES 3 and 4) is employed for fixing with respect to the brace 27 upper and lower rods 67 and 68. The rods 66 and 68 are employed in conjunction with a connection therebetween which limits downward movement of the ends of the radius rods and supporting arms 48 to prevent them from falling to the ground and to prevent their assuming dead-center positions with respect to each other. Such means has been omitted from FIGURE 1 to avoid confusion with the means connected between the rods 65 and 67.

The rod 67 is provided at its rear end with a sheave 70, while the rod 65 is provided at its forward end with a sheave 71. An adjusting cable 72 (FIGURE 7) is wound at one end on the reel 44, then passes around the pulley 39, thence upwardly, rearwardly as at 73 around the sheave 71, then extends downwardly and forwardly as at 74 around the sheave 70. The other end 75 of the cable then extends upwardly and rearwardly to be anchored as at 76 to the block of the sheave 71. Obviously, the winding of the cable on the reel by turning the handle 45 pulls on the cable to pull the free ends of the radius rods and supporting arms closer to each other to decrease the angle therebetween while, conversely, the reversing of the movement of the reel slacks off the cable so as to increase the angle referred to. In the interest of safety, means is connected between the rods 66 (FIGURE 11) and 68 (FIGURE 4) to limit the angle between the radius rods and supporting rods to a desired maximum for the reason stated above, such safety means forming no part per se of the present invention.

Operation

The carriage is shipped in knocked-down condition, the wheels, the radius rods and supporting rods being removed from the axle assembly. The radius rods 25 and 26 are separately packed and the same is true of the supporting rods 48. The braces 27 and 56 are also separately packed. The pivot members 29 may or may not be assembled with respect to the radius arms at the factory. If not, they are readily secured in position.

In assembling the device, the operator will place each of the radius rods 26 in position by sliding it axially over the associated spindle 14, and engagement of each arm with the adjacent end of the sleeve 12 will limit its inward movement. The adjacent ends of the supporting arms 48 are then slipped into position as shown in FIGURE 2, whereupon the two flanged collars 19 are secured to the axle spindles 14 and clamped in position. The wheels 10 then may be applied and fixed by the nuts 21.

As the next step, the user may place the wheels 50 (FIGURE 9) in position on the axle 55 and secure them in any suitable manner, whereupon the ends of the axle 55 are inserted in the ends of the radius rods 48. The latter elements readily can be spread apart at this time since the braces 56 have not yet been placed in position. After the assembling of the wheels 50, the braces 56 are applied and bolted as in FIGURE 10.

The conveyor trough 30 to be used with the apparatus is then placed in position with the upper end supported by the rollers 50. The sides of such trough will have been previously provided with openings through which the short pipe sections 29 are adapted to enter. These pipe sections are then placed in position, whereupon the brace 27 is applied and fixed in position. The adjusting cable then may be connected as described above and the movement limiting means (not shown) connected between the rods 66 and 68. The apparatus is now ready for use.

It will be apparent that the radius rods and the supporting arms 48 are adapted to pivot about the axle assembly to vary the angle between such elements to predetermine the angle of the conveyor trough to the horizontal. This may be adjusted as desired, as stated above. The carriage with the conveyor thereon may be wheeled to any desired point for use, as will be obvious.

As previously stated, the brace 27 strengthens the radius rods and at the same time maintains the short pipe sections 29 (FIGURE 6) in engagement with the conveyor trough. A similar function is served by the brace 56, it being unnecessary to provide any other anchoring means to prevent endwise displacement of the shaft 55 (FIGURE 9).

Practically all of the exposed structural parts of the apparatus, with the structure described, may be galvanized to eliminate trouble which frequently occurs when a structure of this kind is painted, chipping and rusting being eliminated. Moreover, the structure is such as to facilitate the shipment of the parts in knocked-down condition, thus greatly saving on shipping rates. The axle assembly is an important feature of the construction. Practically nothing of this axle assembly is exposed except the outer surface of the tubular member 12, which is galvanized. The radius rods and supporting arms cover that portion of each spindle between the tubular member 12 and the adjacent wheel 10. The bushings 13 are welded on the axle spindles with their ends slightly separated as shown in FIGURE 2. These bushings initially are slidable into the tubular member 12 but the swaging of the latter slightly reduces its diameter to bring it into tight fitting engagement with the bushings 13 and the inward deforming of the tubular member 12 between the bushings of each pair positively fixes the tubular member against endwise displacement relative to the spindles 14. Thus the axle assembly forms a rigid permanent unit. The flanged collars 19 maintain the adjacent ends of the radius rods and supporting rods in proper position. These collars also permit the ready removal of either or both wheels 10 while continuing to serve as means for maintaining the radius rods and supporting rods in proper position.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A carriage for a conveyor, comprising an axle assembly, radius rods and supporting arms extending in opposite directions from said axle assembly and having means at the outer ends thereof for supporting a conveyor, said axle assembly comprising a galvanized tubular body, a spindle projecting into each end of said tubular body and fixed with respect thereto, each spindle having an end projecting from said tubular body, a wheel mounted on the end of each spindle, said radius rods and supporting arms comprising pairs of tubular supporting means for the conveyor, the tubular ends of one pair of such supporting means being transversely apertured to receive the respective spindles between said tubular member and said wheels, and collars fixed to said spindles between the respective ends of said one pair of supporting means and the associated wheel, the ends of the tubular members of the other pair of supporting means lying inwardly of and adjacent the respective ends of said one pair of supporting means and being transversely apertured at opposite sides to respectively receive said spindle and said tubular axle body, and snugly enclosing the end of the latter.

2. A carriage for a conveyor, comprising an axle assembly, radius rods and supporting arms extending in opposite directions from said axle assembly and having means at the outer ends thereof for supporting a conveyor, said axle assembly comprising a galvanized tubular body, a spindle projecting into each end of said tubular body, a pair of spaced bushings surrounding and fixed to each spindle within the ends of said tubular body, said tubular body being deformed radially inwardly in the space between the bushings of each pair to fix said tubular body against endwise movement relative to said bushings, each spindle having an end projecting from said tubular body, and a wheel mounted on the end of each spindle, said radius rods and supporting arms being tubular and being diametrally apertured for insertion over said axle assembly inwardly of each wheel, the diametral apertures in the innermost thereof being sized to limit its inward position so as to protectively cover the end of said tubular axle body.

3. A carriage for a conveyor comprising an axle assembly, radius rods and supporting arms extending in opposite directions from said axle assembly, the adjacent ends of said radius rods and supporting arms being apertured to receive and be supported by said axle assembly, means at the other ends of said supporting arms for supporting a conveyor, the other ends of said radius rods being spaced from and free of connection with each other, inwardly extending trunnions carried by said other ends of said radius rods, said conveyor comprising a trough having spaced parallel side walls apertured to receive said trunnions to pivotally support said conveyor, and detachable bracing means connected between said radius rods, said bracing means functioning to prevent the spreading of said other ends of said radius rods to maintain said trunnions in pivoting engagement with said conveyor trough.

4. A carriage according to claim 3 wherein said radius rods converge toward said other ends thereof, said other ends of said radius rods being deformed to provide inwardly thereof faces parallel to each other and to the sides of said conveyor trough and from which faces said trunnions project coaxially toward each other.

5. A carriage for a conveyor, comprising an axle assembly, radius rods and supporting arms extending in opposite directions from said axle assembly and having adjacent ends connected to said axle assembly for pivoting movement relative thereto to vary the angle between said radius rods and supporting arms, means for pivotally connecting to the other ends of said radius rods the trough of a conveyor extending throughout the length of the carriage and beyond the other ends of said supporting arms, rollers at said other ends of said conveyor arms engaging and supporting said conveyor, an axle upon which said rollers are mounted, said other ends of said supporting arms being hollow and having inner wall portions through which said axle projects and imperforate outer walls longitudinally beyond the ends of said axle, and detachable bracing means connected between said other ends of said supporting arms to fix them with respect to each other to maintain said axle in engagement with said arms.

6. A carriage according to claim 5 wherein said inner walls of said other ends of said supporting arms are flattened parallel to each other, said rollers having flat remote faces adjacent said inner walls and provided with peripheral flanges between which is received the adjacent portion of said conveyor, each roller having a resilient peripheral band directly engaging and supporting the adjacent portion of said conveyor.

7. A carriage for a conveyor, comprising an axle assembly, radius rods and supporting arms extending in opposite directions from said axle assembly and having adjacent ends connected to said axle assembly for pivoting movement relative thereto to vary the angle between said radius rods and supporting arms, the other ends of said radius rods being spaced from and free of each other for the reception therebetween of an adjacent portion of a conveyor trough extending beyond the other ends of said supporting arms, trunnions projecting inwardly from said spaced ends of said radius rods, the trough of the conveyor having spaced parallel side walls provided with openings to receive said trunnions to pivotally support the conveyor relative to said radius rods, rollers at said other ends of said conveyor arms engaging and supporting said conveyor, an axle upon which said rollers are mounted, said other ends of said supporting arms being hollow and having inner wall portions through which said axle projects and imperforate outer walls longitudinally beyond the ends of said axle, and detachable bracing means connected between said other ends of said supporting arms to fix them with respect to each other to maintain said axle in engagement with said arms.

8. A carriage for a conveyor, comprising an axle assembly, radius rods and supporting arms extending in opposite directions from said axle assembly and having adjacent ends connected to said axle assembly for pivoting movement relative thereto to vary the angle between said radius rods and supporting arms, the other ends of said radius rods being spaced from and free of each other for the reception therebetween of an adjacent portion of a conveyor trough extending beyond the other ends of said supporting arms, trunnions projecting inwardly from said spaced ends of said radius rods, the trough of the conveyor having spaced parallel side walls provided with openings to receive said trunnions to pivotally support the conveyor relative to said radius rods, detachable bracing means connected between said radius rods to fix said other ends thereof against movement away from each other to maintain said trunnions in engagement with said conveyor, rollers at said other ends of said conveyor arms engaging and supporting said conveyor, an axle upon which said rollers are mounted, said other ends of said supporting arms being hollow and having inner wall portions through which said axle projects and imperforate outer walls longitudinally beyond the ends of said axle, and detachable bracing means connected between said other ends of said supporting arms to fix them with respect to each other to maintain said axle in engagement with said arms.

9. A carriage for a conveyor, comprising an axle assembly, radius rods and supporting arms extending in opposite directions from said axle assembly and having adjacent ends connected to said axle assembly for pivoting movement relative thereto to vary the angle between said radius rods and supporting arms, the other ends of said radius rods being spaced from and free of each other for the reception therebetween of an adjacent portion of a conveyor trough extending beyond the other ends of said supporting arms, trunnions projecting inwardly from said spaced ends of said radius rods, the trough of the conveyor having spaced parallel side walls provided with openings to receive said trunnions to pivotally support the conveyor relative to said radius rods, detachable bracing means connected between said radius rods to fix said other ends thereof against movement away from each other to maintain said trunnions in engagement with said conveyor, rollers at said other ends of said supporting arms engaging and supporting said conveyor, an axle upon which said rollers are mounted, said other ends of said supporting arms being hollow and having inner wall portions through which said axle projects and imperforate outer walls longitudinally beyond the ends of said axle, detachable bracing means connected between said other ends of said supporting arms to fix them with respect to each other to maintain said axle in engagement with said arms, and means connected between said two bracing means for exerting a force therethrough to move said bracing means toward or away from each other to vary the angularity of said radius rods and said supporting arms relative to each other.

References Cited in the file of this patent
UNITED STATES PATENTS
2,604,203   Neighbour _____ July 22, 1952